United States Patent
Rubel et al.

[11] 3,782,787
[45] Jan. 1, 1974

[54] TRACTION STUD ASSEMBLY FOR SNOWMOBILES

[76] Inventors: Edward R. Rubel, 68 Landing Rd. South, Rochester, N.Y. 14610; Frank L. Martin, Jr., 2 S. Pittsford Hills Cir.; Robert B. Rubel, 1085 Pittsford Victor Rd., both of Pittsford, N.Y. 14534

[22] Filed: Jan. 10, 1972

[21] Appl. No.: 216,582

[52] U.S. Cl.............................. 305/35 EB, 305/54
[51] Int. Cl............................................. B62d 55/24
[58] Field of Search.................. 305/35 EB, 54, 38; 152/222

[56] References Cited
UNITED STATES PATENTS
3,672,422  6/1972  Greipel ............................... 305/54
3,572,851  3/1971  Schuler ........................... 305/35 EB
3,558,198  1/1971  Tomita ........................... 305/35 EB

OTHER PUBLICATIONS

TRACS–Advertising Brochure of Roetin Industries, Rochester N.Y.

Snowmobile Specialties, Inc. Catalog pg. 44 8-1970 Saint Paul, Minn.

Primary Examiner—Richard J. Johnson
Attorney—E. Manning Giles et al.

[57] ABSTRACT

Traction stud assemblies for snowmobile belt include a pair of spaced parallel studs rigidly connected at one end to a common flat support plate. The studs are threaded to serve both as mounting as well as traction elements.

6 Claims, 8 Drawing Figures

PATENTED JAN 1 1974 3,782,787

TRACTION STUD ASSEMBLY FOR SNOWMOBILES

The present invention relates to traction devices and more particularly concerns a traction stud assembly for snowmobile belts to improve the belt's traction on icy surfaces.

Snowmobiles are steered much like a bicycle, in part by weight shifting and turning requires sidewise drifting of the rear end of the snowmobile which is supported by the traction belts. Accordingly, the traction belt is generally designed to permit such drifting of in that the treads consist basically of transversely extending upraised rib sections that afford forward traction but allow sidewise sliding movement. The majority of snowmobile belts are made of rubber or plastic material and the traction treads are molded as part of the main body. Other belts are provided with steel cleats to improve traction. In any case, the belts are designed to provide forward traction in various conditions of snow from fluffy powder to hard packed snow. However, in icy conditions, the conventional belts do not provide sufficient traction in the forward direction and sidewise drifting becomes uncontrollable. Accordingly, there is a need for means which can be attached to the belt to improve the belt's traction capabilities in icy conditions.

SUMMARY OF THE INVENTION

In accordance with the present invention, a traction stud assembly is provided which can be secured to the belt of a snowmobile to improve its traction capabilities in icy conditions. The traction stud assemblies of the present invention include a pair of spaced parallel elongated studs which are rigidly connected with respect to one another at one end thereof by a flat support plate. At their opposite ends the studs are pointed and intermediately there between the studs are threaded so as to serve as a bolt. When installed on a belt, the studs extend through the belt with the support plate serving as a large washer on the inside surface of the belt and nuts are threaded tightly on to the stud bodies to secure the assembly to the belt.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DETAILED DESCRIPTION

Figure 1:
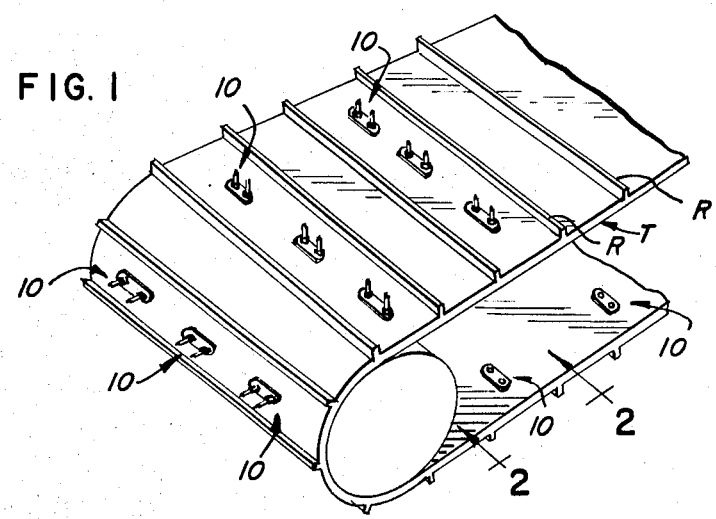
FIG. 1 is a perspective view illustrating a segment of a conventional snowmobile traction belt with a plurality of traction stud assemblies of the present invention mounted thereto.

With reference now to the drawings, in FIG. 1 there is illustrated a plurality of the traction stud assemblies 10 of the present invention mounted on a traction belt T of a snowmobile. The snowmobile belt T illustrated herein has a plurality of transversely extending traction ribs R in spaced relationship to provide forward traction of the vehicle.

Figure 2:
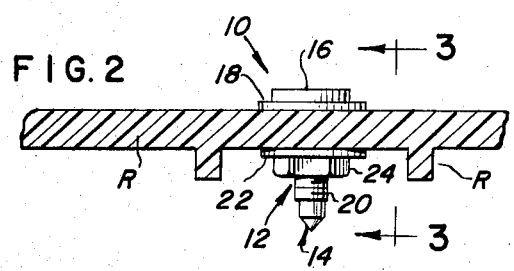
FIG. 2 is a section view taken as indicated along the line 2—2 of FIG. 1.
Figure 4:
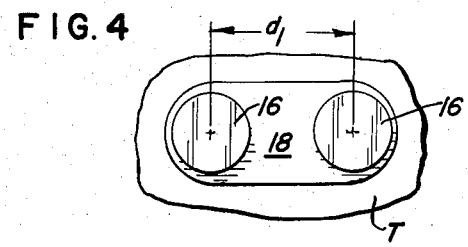
FIG. 4 is a top plan view of the traction stud assembly as shown in FIG. 3.
Figure 3:
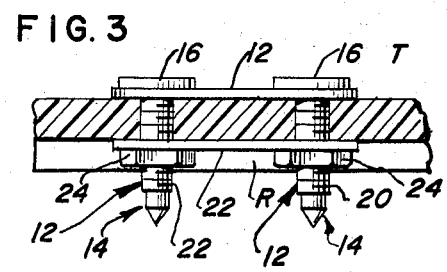
FIG. 3 is a sectional view taken as indicated along the line 3—3 of FIG. 2.
Figure 8:
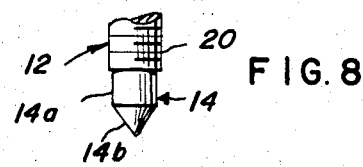
FIG. 8 is a fragmentary view showing details of the free end region of the stud.

Details of the traction stud assemblies for use with traction belts of the type having molded cleats or tread ribs are shown in FIGS. 2 through 4 and FIGS. 5 through 7 illustrate the form of the traction stud assembly for use with snowmobile belts having steel cleats. In each case, the traction stud assemblies comprise a pair of elongated spaced apart traction studs 12, each having a free end 14 that terminates in a point for puncturing icy surfaces and an opposite end which terminates in a flat head 16 of greater diameter than that of the main length of the stud. The studs 12 extend through a pair of holes provided in a flat elongated support plate 18 and the heads 16 of the studs are welded to the plate 18 so that the studs 12 and plate 18 are rigid with respect to each other. The main length region between the head 16 and the free end 14 of each of the studs is threaded as at 20 to accept suitable nuts 24. Hence, the studs serve a dual purpose as an ice gripping element and as a mounting element. With reference to FIGS. 2–4, the traction stud assembly for use with snowmobile belts of the type having molded cleats includes a flat back support plate 22 of similar configuration to the upper support plate 18 to serve as a support washer for the pair of studs and which acts to prevent the studs from tearing out of the traction belt. In the embodiment illustrated herein for use with snowmobile belts without steel cleats, the studs 12 are spaced apart a distance dl of approximately 1 inch and have a length, when measured from the bottom surface of the support plate 18, of approximately 1 inch. The major diameter of the studs is approximately ¼ inch. With the exception of the nuts, the material used for all of the component parts of the stud assembly illustrated herein is AISI C1010 which has been heat treated after quenching to a temperature of 750° F.

Figure 5:
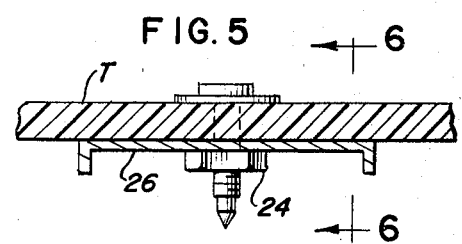
FIG. 5 is a sectional view similar to FIG. 2 and showing a traction stud assembly mounted on a snowmobile traction belt that is provided with a steel cleat.
Figure 7:
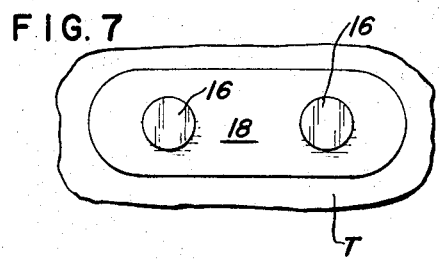
FIG. 7 is a top plan view of the traction stud assembly as shown in FIG. 6.
Figure 6:
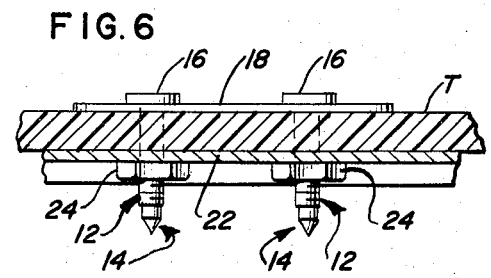
FIG. 6 is a sectional view taken as indicated along the line 6—6 of FIG. 5.

With reference to FIGS. 5–7, there is illustrated a somewhat modified form of traction stud assembly intended for use with snowmobile belts having steel cleats. In FIGS. 5–7 a steel cleat 26 is shown affixed to the belt T by rivets (not shown). To install the stud assembly to steel cleated belts, a pair of rivets which connect the cleat to the belt are removed and the studs 12 inserted through the rivet openings, the studs being spaced apart a distance which permits such insertion. The principal difference between the embodiment of FIGS. 5–7 and the embodiment of FIGS. 2–4 resides in the major diameter of the studs 12. In the form used for steel cleated belts, the major diameter of the studs 12 is approximately 3/16 inch to permit insertion of the studs through the rivet openings. Another difference is that the embodiment of FIGS 5-7 does not require the bottom support plate 22 since the steel cleat itself serves as a wide washer for the studs.

While preferred constructional features of the invention are embodied in the structure illustrated herein, it is to be understood that changes and variations may be made by those skilled in the art without departing from the spirit and scope of the appended claims.

What is claimed is:

1. A traction device having a flat support plate and a pair of elongated studs rigidly connected to the plate and projecting therefrom in parallel spaced relation, each of said studs having a free end terminating in a point, an intermediate region of each stud between the point and the plate being threaded so as to constitute a bolt length.

2. In a traction stud assembly for connection to a snowmobile belt to improve traction of the snowmobile in icy conditions, a traction stud unit including a flat support plate and a plurality of elongated studs rigidly connected to the plate and projecting therefrom in parallel spaced relation, each of said studs having a free end terminating in a point and at least a pair of said studs having an intermediate length region between the plate and the point threaded so as to constitute a pair of bolts.

3. In a traction stud assembly in accordance with claim 2 wherein said studs each extend through said plate, said studs each having a flat head of a diameter greater than the diameter of the main length portion thereof welded to said plate on the side thereof remote from the point of the stud.

4. In a snowmobile belt traction stud assembly, a flat plate for engagement with the inside surface of the belt, a pair of elongated studs rigidly connected to the plate to project therefrom through and beyond the belt in parallel spaced apart relation, each of said studs having a free end of reduced diameter for penetrating hard surfaces and a threaded intermediate length region constituting a bolt length whereby said studs each constitute combined mounting and surface traction elements.

5. In a snowmobile belt stud assembly in accordance with claim 4 wherein said studs each project approximately 1 inch from the plate.

6. In an snowmobile belt stud assembly in accordance with claim 5 wherein the free end of each of said studs includes a termination cone-shaped length region extending approximately ⅛ inch and a smooth cylindrical length region extending approximately ⅛ inch between the cone-shaped length region and the threaded length region.

* * * * *